US008351776B2

(12) United States Patent
Garg et al.

(10) Patent No.: US 8,351,776 B2
(45) Date of Patent: Jan. 8, 2013

(54) AUTO-FOCUS TECHNIQUE IN AN IMAGE CAPTURE DEVICE

(75) Inventors: Shashank Garg, Pune (IN); Vinayak Pore, Pune (IN); Soumenkumar Dey, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 12/650,136

(22) Filed: Dec. 30, 2009

(65) Prior Publication Data

US 2010/0103281 A1    Apr. 29, 2010

Related U.S. Application Data

(62) Division of application No. 11/686,958, filed on Mar. 15, 2007.

(51) Int. Cl.
    *G03B 3/10* (2006.01)
(52) U.S. Cl. .................................................... 396/123
(58) Field of Classification Search ................... 396/123
    See application file for complete search history.

(56) References Cited

U.S. PATENT DOCUMENTS

| 6,456,737 | B1 | 9/2002 | Woodfill et al. |
| 7,020,783 | B2 | 3/2006 | Vange et al. |
| 7,236,470 | B1 | 6/2007 | Bims |
| 7,574,016 | B2 | 8/2009 | Steinberg et al. |
| 2003/0123751 | A1 | 7/2003 | Krishnamurthy et al. |
| 2003/0128756 | A1 | 7/2003 | Oktem |
| 2005/0024487 | A1 | 2/2005 | Chen |
| 2005/0275747 | A1 | 12/2005 | Nayar et al. |
| 2006/0215924 | A1 | 9/2006 | Steinberg et al. |
| 2006/0274643 | A1 | 12/2006 | Choyi et al. |
| 2006/0291845 | A1 | 12/2006 | Sugimoto |
| 2007/0104472 | A1 | 5/2007 | Quan et al. |
| 2007/0206941 | A1 | 9/2007 | Maruyama et al. |
| 2008/0043686 | A1 | 2/2008 | Sperti et al. |
| 2008/0152245 | A1 | 6/2008 | El-Maleh et al. |
| 2008/0225944 | A1* | 9/2008 | Pore et al. ................ 375/240.03 |

OTHER PUBLICATIONS

Sun et al., "A Rate Control Algorithm for Wireless Video Transmission Using Perceptual Tuning", Proceedings of the International Conference on Information Technology: Coding and Computing (ITCC'05), 0-7695-2315-3/05 IEEE, pp. 1-6. 2005.

Tong et al., "Region of Interest Bases H.263 Compatible Codec and Itsrate Control for Low Bit Rate Video Conferencing", Proceedings of 2005 International Symposium on Intelligent Signal Processing and Communication Systems, pp. 249-252, Dec. 13-16, 2005.

(Continued)

*Primary Examiner* — Rodney Fuller

(57) ABSTRACT

Multiple sets of pixel values representing a captured image of a scene are received, with each set representing an image captured with a corresponding degree of focus. An image processor may identify a region of interest in the captured image, automatically determine the configuration parameters for a lens assembly to provide a desired degree of focus for the region of interest, and generate signals to configure a lens assembly. In an embodiment, the region of interest is a face, the desired degree of focus of the face is determined by computing a rate of variation of luminance of pixels representing the face, and the desired degree is the degree of the image having the maximum degree of focus.

22 Claims, 15 Drawing Sheets

OTHER PUBLICATIONS

Baccichet et al., "Network-Aware H.264/AVC Region of Interest Coding for a Multi-Camera Wireless Surveillance Network", pp. 1-6, Downloaded Mar. 2007.

Sun et al., "Region-Based Rate Control and Bit Allocation for Wireless Video Transmission", IEEE Transactions on Multimedia, vol. 8, No. 1, pp. 1-10, Feb. 2006.

Chen et al., "Region-Of-Interest Video Coding Based on Face Detection", Springer-Verlag Berlin Heidelberg, pp. 1201-1211, 2002.

Baccichet, "H.264/AVC Compliant Solutions for Slep-Based Error Robustness and for Video Surveillance", I.E.I.I.T.—National Research Center Turin-Italy, pp. 1-29, Stanford, Dec. 9, 2005.

* cited by examiner

AUTO-FOCUS TECHNIQUE IN AN IMAGE CAPTURE DEVICE

CROSS-REFERENCES TO RELATED APPLICATIONS

This Divisional application claims the benefit of the commonly-owned US Patent Application, application Ser. No. 11/686,958, filed on Mar. 15, 2007, by Garg, et al., and titled "Auto-Focus Technique in an Image Capture Device."

FIELD

The present disclosure relates generally to the field of image processing, and more specifically to an auto-focus technique in image capture devices such as still picture cameras and video cameras.

BACKGROUND

An image capture device (ICD) generally refers to a device which captures images of scenes. When designed to capture a single image of a scene, the device is referred to as a camera. On the other hand, when continuous images of a scene are captured by a device, the device is often referred to as a camcorder. The images can be captured in digital form or analog form. To capture images in digital form, sensors may be arranged in the form of an array, with each sensor in the array forming a digital value representing a point (small portion) of the scene. On the other hand, in analog form, a light-sensitive medium is designed to respond to incident rays to capture the image. In general, the sensors and other media which capture the images are referred to as capturing media.

ICDs also generally contain a lens assembly, which receives light rays representing a scene sought to be captured, and converges the light onto the capturing medium. The lens assembly may contain one or more lenses, which can be configured to obtain various degrees of convergence. In one embodiment, configuration entails moving the absolute and/or relative position of individual lenses (typically along an imaginary axis connecting the lens assembly to the capturing medium) contained in a lens assembly. However, configuration can entail any other changes (e.g., effecting curvature change, etc.) as provided by the present/future underlying technology to effect focusing (described below) of the received light rays to the capturing media.

It is generally required to focus on a scene of interest before capturing the scene. Focusing refers to configuring a lens assembly such that the incident light rays are made to converge on the capturing medium. As a simplified illustration, it may be appreciated that parallel light rays originating at infinite distance would be received in parallel and would converge at a distance equaling a focal length of the lens assembly.

As a scene gets closer, the rays may be less than parallel (i.e., divergent), and thus the distance between the lens assembly and the capturing medium may need to be correspondingly more than the focal length (assuming the focal length of the lens assembly does not change). In general, a resulting captured image is rendered distinct and clear when the focusing is accurate. When the lens assembly is focused less than accurately, the clarity of the captured image is generally correspondingly less.

Several ICDs provide a manual mechanism by which a user can configure lens assembly to obtain a desired focus, typically while viewing the image through the lens assembly. Assuming only the position of the lens needs to be adjusted for focusing, the lens position is changed directly in response to the user operation of the manual mechanism. Once a desired focusing is set, the user then captures the image. Such manual mechanism to configuring lens assembly may be termed as manual focusing.

On the other hand, there has been a general recognized need for auto-focus ICDs. Auto-focusing generally refers to determining the appropriate parameters (e.g., distance in the examples above) to configure the lens assembly, and performing the determined configuration by using appropriate computations and configurations within an ICD.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

A processor provided according to an aspect of the present invention receives multiple sets of pixel values, with each set of pixel values representing a corresponding image of a scene captured using a corresponding set of configuration parameters for a lens assembly. The processor identifies a region of interest of the scene, and determines the degree of focus present in the region for each image. A desired set of configuration parameters are then determined based on the degrees of focus and corresponding sets of configuration parameters. The processor then generates signals to configure the lens assembly according to the desired set of configuration parameters.

In an embodiment, the region is determined to be an image portion representing a face within the scene such that a user of a image capture device can capture images focused on faces. However, to the extent other types of objects can be characterized for reliable 'recognition' within image capture devices using appropriate image processing mechanisms, auto-focus may be based on such other types of objects as well.

Another aspect of the present invention provides a reliable approach to determine image portions representing a desired object (e.g., skin) in a scene. In one embodiment, the two chrominance components and the sum of the two components are checked to determine whether each of the three values is in a respective range. If the three values are in the respective ranges, the pixel value is deemed to represent skin. Further processing may be performed to recognize the region representing the desired object from such points.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

Camera

Figure 1:
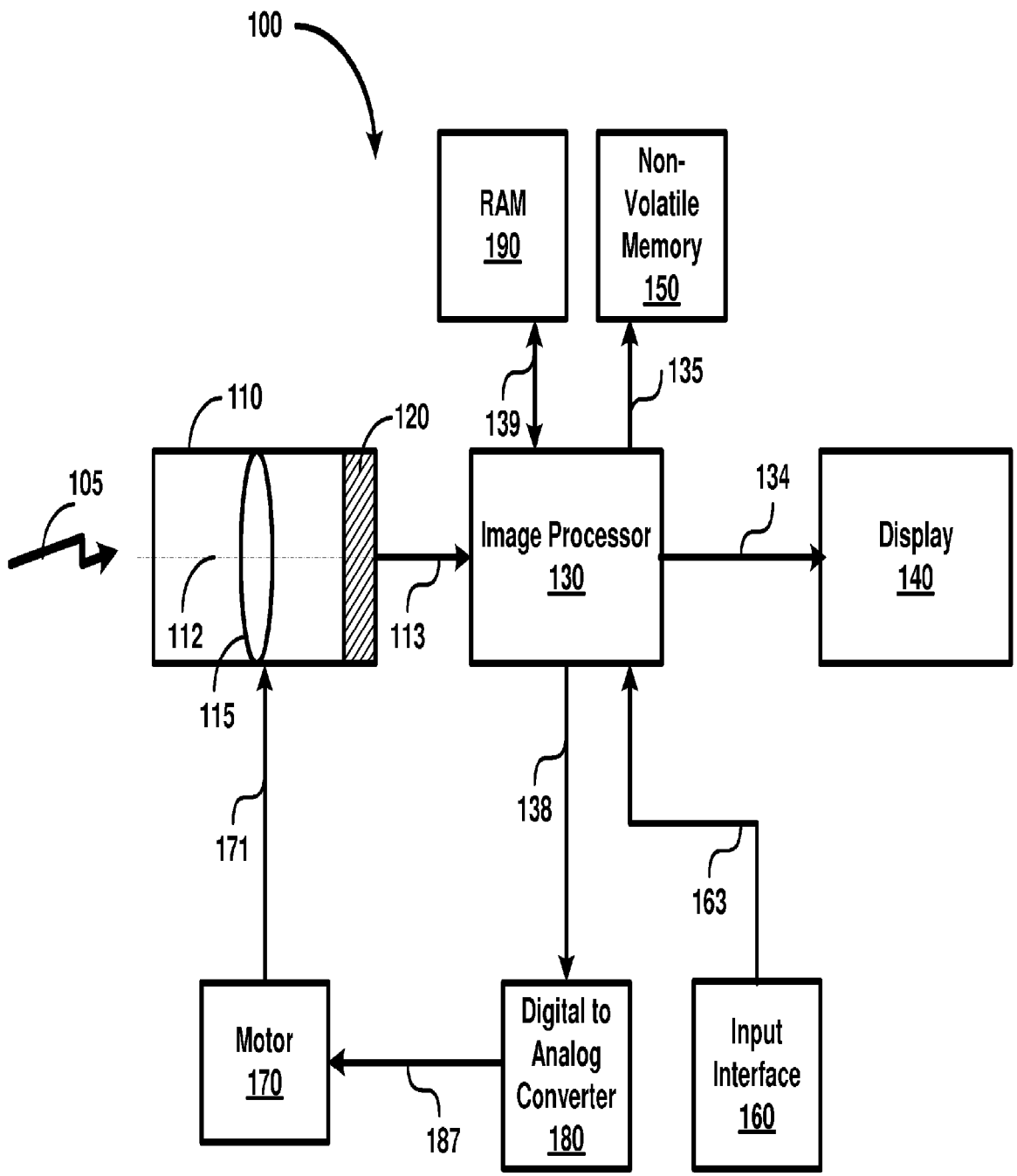
FIG. 1 is a block diagram of a camera illustrating an example embodiment in which several aspects of the present invention may be implemented.

FIG. 1 is a block diagram of a camera used to illustrate an example embodiment in which several aspects of the present invention may be implemented. While the description is provided with respect to a still camera (which facilitates a user to capture a single or a few images of a scene) merely for illustration, it should be appreciated that the features can be implemented in various other image capture devices without departing from the scope and spirit of several aspects of the invention, as will be apparent to one skilled in the relevant arts by reading the disclosure provided herein.

Camera 100 is shown containing lens enclosure 110, lens assembly 115, image sensor array 120, image processor 130, display 140, non-volatile memory 150, input (I/P) interface 160, motor 170, digital to analog (D/A) converter 180, and RAM 190. Only the components as pertinent to understanding of the operation of the example embodiment are included and described, for conciseness and ease of understanding. Each component of FIG. 1 is described in detail below.

Lens enclosure 110 is shown housing lens assembly 115 and image sensor array 120, and is generally designed to shield extraneous (i.e., other than the light being received via the lens assembly) light from being incident on image sensor array 120 (in general, capturing medium). Lens assembly 115 may contain one or more lenses, which can be configured to focus light rays (denoted by arrow 105) from a scene to impinge on image sensor array 120.

In one embodiment, lens assembly 115 is moved relative to image sensor array 120 along an axis (shown as dotted line 112) by appropriate operation of motor 170 to obtain a desired degree of focus when capturing an image received on path 105. However, depending on the technology available, various alternative structures/material may be employed for lens assembly and the corresponding controls may be presented on path 171 to achieve a desired configuration.

D/A converter 180 receives a digital value from image processor 130 (on path 138) representing a distance by which lens assembly 115 is to moved, and converts the digital value to an analog signal which is provided to motor 170 via path 187. It should be understood that the digital value represents an example configuration parameter used to configure lens assembly 115. However, depending on the implementation of lens assembly 115, additional/different parameters may be received as well.

Motor 170 is coupled to lens assembly 115, and operates to adjust the absolute position of lens assembly 115, and/or relative positions of individual lenses within lens assembly 115, in response to receiving a corresponding analog signal from D/A converter 180. Motor 170 may be coupled to lens assembly 115 in a manner facilitating movement of either the whole of lens assembly 115 or individual lenses within it along an axial direction indicated by dotted line 112.

Display 140 displays an image frame in response to the corresponding display signals received from image processor 130 on path 134. Display 140 may also receive various control signals (not shown) from image processor 130 indicating, for example, which image frame is to be displayed, the pixel resolution to be used etc. Display 140 may also contain memory internally for temporary storage of pixel values for image refresh purposes, and is implemented in an embodiment to include an LCD display.

Input interface 160 provides a user with the facility to provide inputs, for example, to select features such as whether auto-focus is to be enabled/disabled. The user may be provided the facility of any additional inputs, as described in sections below.

Image sensor array 120 may contain an array of sensors, which together generate digital values representing an image represented by light rays received via lens assembly 115. Each sensor may generate a digital value representing the corresponding point (small portion) of the image. The digital value can be in RGB format, with each component value being proportionate the corresponding color intensity and time of exposure (shutter not shown). Image sensor array 120 forwards the array of digital values as a stream sequentially to image processor 130 on path 122 for further processing. In an embodiment, image sensor array 120 is implemented as a CCD (charge coupled device)/CMOS sensor array.

RAM 190 stores program (instructions) and/or data used by image processor 130. Specifically, pixel values that are to be processed and/or to be user later, may be stored in RAM 190 via path 139 by image processor 130.

Non-volatile memory 150 stores image frames received from image processor 130 via path 135. The image frames may be retrieved from non-volatile memory 150 by image processor 130 and provided to display 140 for display. In an embodiment, non-volatile memory 150 is implemented as a flash memory. Alternatively, non-volatile memory 150 may be implemented as a removable plug-in card, thus allowing a user to move the captured images to another system for viewing or processing or to use other instances of plug-in cards.

Non-volatile memory 150 may contain an additional memory unit (e.g. ROM, EEPROM, etc.), which store various instructions, which when executed by image processor 130 provide various features of the invention described herein. In general, such a memory unit (including RAMs, non-volatile memory, removable or not) from which instructions can be retrieved and executed are referred to as a computer readable medium. It should be appreciated that the computer readable medium can be deployed in various other embodiments, potentially in devices, which are not intended for capturing images, but providing several features described herein.

Image processor 130 forwards pixel values received on path 113 to path 134 to enable a user to view the scene presently pointed by the camera. In addition, when the user 'clicks' a button (indicating intent to record the captured image on non-volatile memory 150), image processor 130 causes the pixel values representing the present (at the time of clicking) image to be stored in memory 150.

In addition, image processor 130 may configure lens-assembly 115 to auto-focus on a scene according to several aspects of the present invention, as described below.

Auto-Focus

Figure 2:
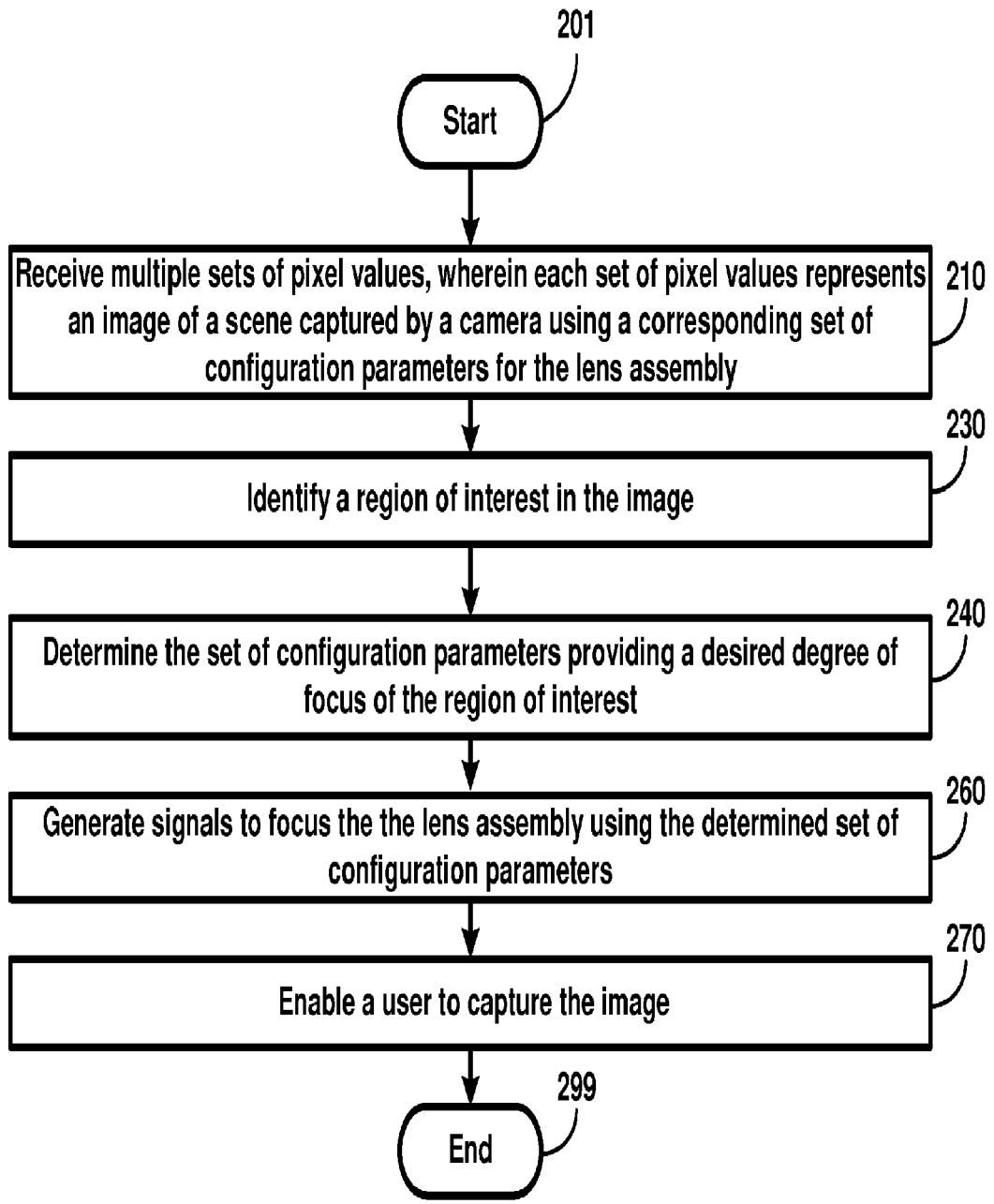
FIG. 2 is a flowchart illustrating the manner in which auto-focus on a scene is achieved in one embodiment.

FIG. 2 is a flowchart illustrating the manner in which lens assembly 115 may be configured to achieve auto-focus on a scene. The flowchart is described with respect to FIG. 1, and in relation to image processor 130, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, image processor 130 receives multiple sets of pixel values. Each received set of pixel values represents an image of a scene captured by camera 100 using a corresponding set of configuration parameters for the lens assembly. Each set of configuration parameters are designed to focus the lens assembly with different degrees of focus at a corresponding time instance. It is also assumed that each image captures the same scene, but with correspondingly different degrees of focus (illustrated below with respect to FIGS. 3A-3D below).

In an embodiment, each set of pixel values received represents a subsampled version (obtained by subsampling an image captured by image sensor array 120) of the image, wherein each pixel value in the subsampled version is generated by averaging the pixel values of a group (e.g., 3.times.3 array of pixel values) of adjacent pixels image captured by lens assembly 115. Control then passes to step 230.

In step 230, image processor 130 identifies a region of interest within (i.e., a part of) each image (corresponding to each set of pixel values received in step 210). Image processor 130 may be implemented with appropriate logic (rules, processing logic, etc.) to identify the region of interest. If different types of regions (e.g., face, grass, sky, etc.) are of possible interest, appropriate inputs may be provided to image processor 130 to identify the specific type of region of interest within the scene. Control then passes to step 240.

In step 240, image processor 130 determines a set of configuration parameters (for lens assembly 115) that provides a desired degree of focus for the image. In an embodiment described below, the desired degree of focus equals the focus of one of the images having best focus, and the configuration parameters corresponding to such an image are selected. However, alternative techniques can be employed which determine the desired degree of focus based on the degree of focus present in the regions of step 230. Control then passes to step 260.

In step 260, image processor 130 generates signals to focus lens assembly 115 using the set of configuration parameters determined in step 240. In an embodiment, image processor 130 provides the configuration parameters as digital values to a D/A converter (such as D/A converter 180), which in turn generates a corresponding analog signal to cause a motor (such as motor 170) coupled to lens assembly 115 to adjust the position of lens assembly 115 to provide the desired degree of focus. Control then passes to step 270.

In step 270, image processor 130 enables a user to capture the image. Image processor 130 may indicate to a user that the lens assembly 115 has been auto-focused, for example, by displaying a message on display 140. The user may then 'click' to capture the image. In response to a user's 'click', image processor 130 stores a set of pixel values of a 'focused' image captured using the determined set of configuration parameters. Alternatively, the user may merely click once and the auto-focusing described above may be performed along with capturing of the image in response to a single click. Control passes to step 299, in which the flowchart ends.

In the description above, although image processor 130 is described as receiving multiple sets of pixel values, each corresponding to a different configuration of the lens assembly, it must be understood that image processor 130 may provide the configuration parameters corresponding to each of the configurations (to cause the lens assembly to be configured).

In particular, image processor 130 may adaptively determine the set of configuration parameters until a desired degree of focus is obtained. In such an adaptive technique, image processor 130 may receive a single set of pixel values in each iteration, determine if the degree of focus is as desired, and provide a new set of configuration parameters for the next iteration based on the degrees of focus identified for the previous iterations. Image processor 130 may then repeat such combination of steps until a desired degree of focus is obtained.

As noted above in step 210, the set of configuration parameters for lens assembly 115 determines how focused (degree of focus) a captured image will be. This is clarified with an illustration below.

Degree of Focus

FIGS. 3A through 3D illustrate the variation of focus with the configuration parameters used for lens assembly 115. The figures are illustrated with respect to a point Po and its corresponding image Pi captured by image sensor array 120. In each of FIGS. 3A through 3D, point Po is located at the same distance from image sensor array 120, but lens assembly 115 is shown located at four different positions from the image sensor array. It must be understood that FIGS. 3A through 3D are illustrated merely to clarify the term 'degree of focus' and its variation with configuration parameters of lens assembly 115, and as such are not intended to depict the actual focus phenomenon precisely.

Figure 3A:
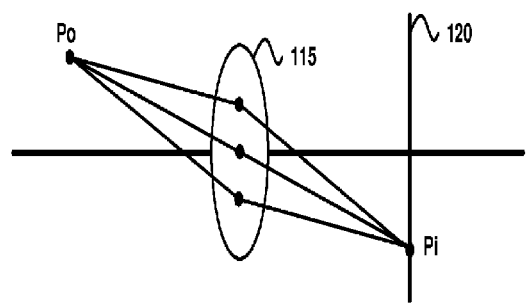
FIGS. 3A through 3D are diagrams illustrating different degrees of focus in corresponding configurations of a lens assembly.

As may be seen from FIG. 3A, representative light rays (depicted as lines emanating from point Po) converge at a single point Pi which lies on image sensor array 120. This configuration of lens assembly 115 results in the image Pi of point Po being focused on image sensor array 120.

Figure 3B:
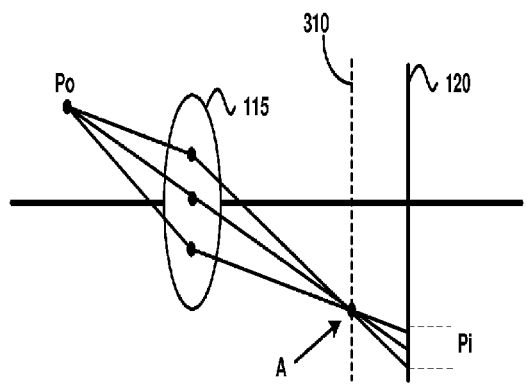

In FIG. 3B, lens assembly 115 is farther away from image sensor array 120 as compared to the case in FIG. 3A (or equivalently, lens assembly 115 is configured using a set of parameters such that image of point Po is focused at point 'A' on a plane 310 rather than on image sensor array 120). It may be seen from FIG. 3B that the image Pi captured by image sensor array 120 now falls over an area instead of being a point as in FIG. 3A. This corresponds to a 'degree of focus' which is less than optimal focus of FIG. 3A.

Figure 3C:
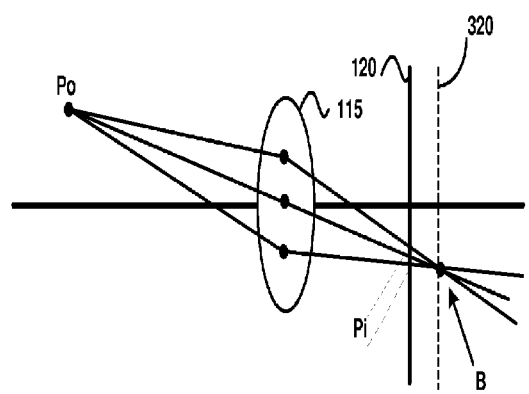

FIG. 3C illustrates a situation wherein lens assembly 115 is closer to image sensor array 120 (as compared to in FIG. 3A). It may be observed that the image of Po is focused on a plane 320 at a point B, while the corresponding image captured by image sensor array is again an area instead of a point. Again, the degree of focus achieved in FIG. 3C is less than the optimal case of FIG. 3A.

Figure 3D:
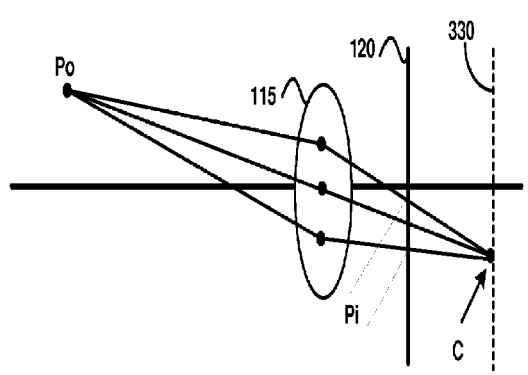

Similarly, FIG. 3D illustrates a situation wherein lens assembly 115 is even closer to image sensor array 120 than shown in FIG. 3C. It may be observed that the image of Po is focused on a plane 330 at a point C, while the corresponding image captured by image sensor array is represented by an even greater area than in FIG. 3C. The degree of focus in FIG.

3C is thus more than that in FIG. 3D. In FIG. 3A we have the maximum degree of focus possible.

The manner in which such degree of focus can be digitally characterized and used in auto-focusing is described below with an example.

Digital Characterization of Degree of Focus

It may also be appreciated from the description above that in FIGS. 3B through 3D the image of point Po captured by image sensor array 120 is a 'diffused' image (spread over an area, instead of being a point), and as such would be less 'sharp' as compared to that in FIG. 3A. Further, the extent of "sharpness" would vary depending on the degree of focus resulting from the particular configuration of lens assembly 115. For example, the image captured by image sensor array 120 in FIG. 3D would be less 'sharp" than in FIG. 3C, since the image is formed over a larger area.

In an embodiment, image processor 130 computes a rate of variation of luminance across pixel values in a region of interest to determine if a desired degree of focus has been obtained, as described below with an example illustration.

Figure 4A:
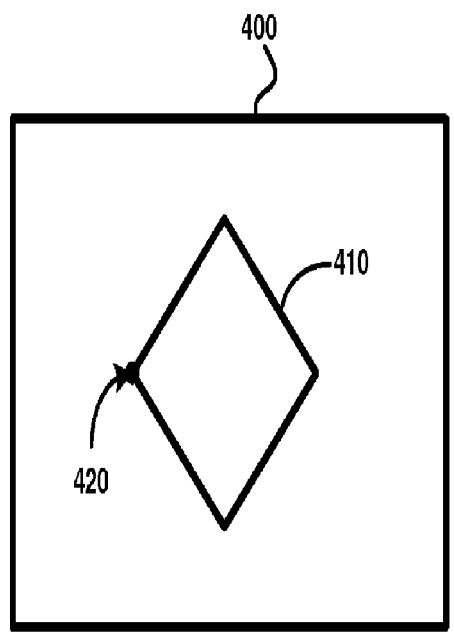
FIGS. 4A through 4C are diagrams illustrating logically how a rate of variation of luminance across pixel values in a region of interest may be used to determine a desired degree of focus.
Figure 4B:
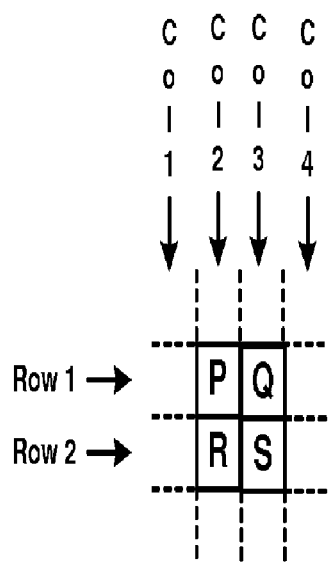
Figure 4C:
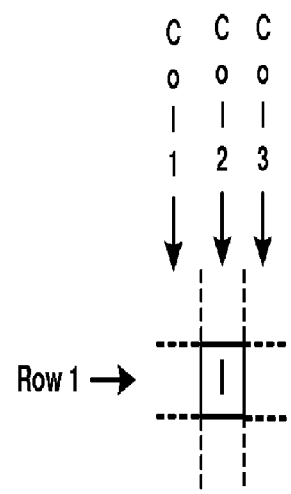

FIGS. 4B and 4C show corresponding images of a point 420 (point 420 being assumed to correspond to a single pixel) in an object 410 (in a scene 400) as captured by image sensor array 120 at two example configuration settings respectively of lens assembly 115. It is assumed that point 420 is a 'white" pixel and has a luminance value 255 (Y value in a YCbCr color space), and pixels to the left and right of point 420 are 'black' pixels each with Y values of 0.

In FIG. 4B, lens assembly 115 is configured such that point 420 is not focused (out of focus) on image sensor array 120. As a result, the image of point 420 as captured by lens assembly 120 falls over several pixels (area) instead of corresponding to a single pixel as might be desired. The image of 420 is shown in FIG. 4B as being 'spread' over four pixels marked as P, Q, R and S (corresponding to example row and column numbers as shown). All other pixels are assumed to be black for ease of illustration. Pixels P, Q, R, and S may have luminance values less than 255 (of point 420), and are assumed, to illustrate the example, to have values 100, 110, 100, and 110 respectively.

Image processor 130 may compute a rate of variation of luminance of pixel values along a horizontal direction (merely as an example, although any other direction could also be used). Thus, image processor 130 may note (compute) a variation of luminance values as 0, 100, 110, 0 corresponding to pixels at columns 1 through 4 in row 1.

In FIG. 4C, lens assembly 115 is configured such that point 420 is focused on image sensor array 120, resulting in a corresponding point image represented by pixel 'I' (in row 1, column 2). Thus, image pixel "I" may have a luminance value of 255, and image processor 130 may note a variation of luminance values as 0, 255, 0 corresponding to pixels at columns 1 through 3 in row 1.

It may be noted that the rate of variation of luminance values in a focused image (as in FIG. 4C) has a higher rate of variation (0, 255, 0) than that (0, 100, 110, 0) in an out-of-focus image (as in FIG. 4B). In general, image processor 130 may compute a rate of variation of luminance across pixels of an entire row (or column, or any other direction), or across only a subset of pixels in the row (column or direction).

Image processor 130, thus, generates 'rate of change of luminance values' for each image (corresponding to a configuration setting for lens assembly 115), and uses the 'rate of change of luminance values' as a measure of the corresponding degree of focus obtained. The rate change can be determined using various high frequency filters, such as Sobel Operator, Laplacian of Gaussian, canny edge detector etc.

As noted above, image processor 130, selects a set of configuration parameters such that the 'rate of change of luminance values' is maximum within a portion of the images. In an embodiment, the portion corresponds to 'face', and face is determined by first determining whether a pixel of an image corresponds to skin. The manner in which pixels corresponding to skin can be identified is described below in further detail.

Identifying Pixels Representing Skin

Figure 5:
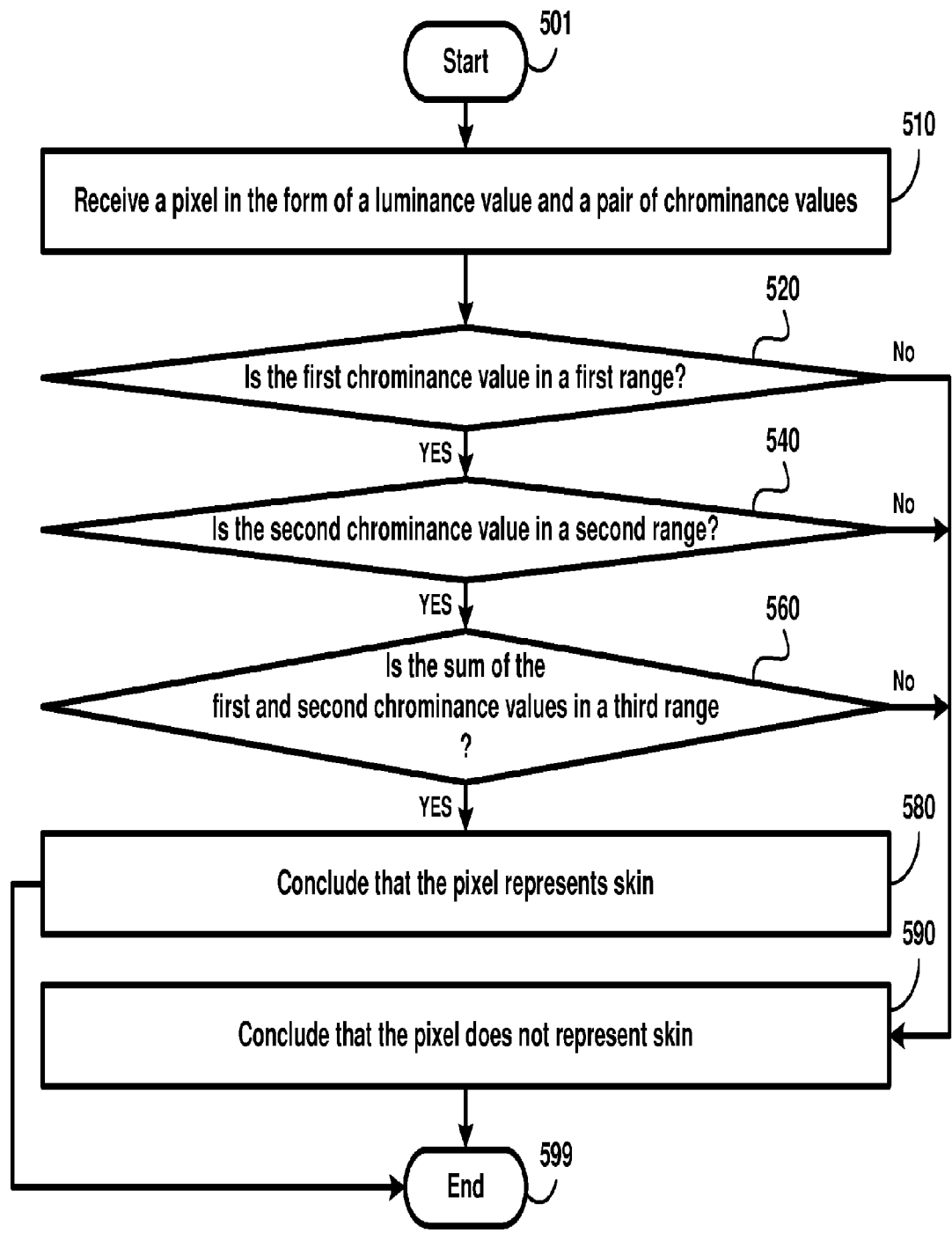
FIG. 5 is a flowchart illustrating the manner in which pixels representing skin are identified in one embodiment.

FIG. 5 is a flowchart illustrating the manner in which image processor 130 identifies pixels representing skin in one embodiment. Again, the flowchart is described with respect to FIG. 1, and in relation to image processor 130, merely for illustration. However, various features can be implemented in other environments and other components. Furthermore, the steps are described in a specific sequence merely for illustration. Various alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 501, in which control passes immediately to step 510.

In step 510, image processor 130 receives a pixel in the form of a luminance value and a pair of chrominance values. In an embodiment, the luminance and chrominance values correspond to the respective values in a YCbCr color space representation (Y corresponding to the luminance value, Cb and Cr corresponding to the pair of chrominance values). Image processor 130 may receive the pixel value in YCbCr form from an external system (such as image sensor array 120), or may internally perform color space conversion of pixel value received in an alternative form (for example, RGB). Control then passes to step 520.

In step 520, image processor 130 determines whether the first chrominance value (Cb) lies in a first range of values. Control passes to step 540 if the value is in the range, else control passes to step 590. In an embodiment the first range corresponds to a range of values between 67 and 123 (both inclusive).

In step 540, image processor 130 determines whether the second chrominance value (Cr) lies in a second range of values. Control passes to step 560 if the value is in the range, else control passes to step 590. In an embodiment the second range corresponds to a range of values between 136 and 175 (both inclusive).

In step 560, image processor 130 determines whether the sum of the first chrominance value (Cb) and the second chrominance value (Cr) lies in a third range of value. Control passes to step 580 if the value is in the range, else control passes to step 590. In an embodiment the third range corresponds to a range of values between 220 and 275 (both inclusive).

In step 580, image processor 130 concludes that the pixel represents skin. Control then passes to step 599, in which the flowchart ends. In step 590, image processor 130 concludes that the pixel does not represent skin. Control then passes to step 599, in which the flowchart ends.

It should be appreciated that the above approach and ranges have been determined based on various experiments and observations. The approach facilitates identifying pixels representing skin with minimal computations (one addition and three comparisons), which facilitates the determination to be performed with minimal processing resources.

It should also be appreciated that approach can be extended to potentially several other objects with appropriate changes to the ranges, as will be apparent to one skilled in the relevant arts by reading the disclosure provided herein.

In one embodiment, to facilitate further processing as regards to auto-focusing, for each pixel in a set of pixels corresponding to an image, image processor 130 determines whether the pixel represents skin or not in a manner illustrated above, and generates a corresponding 'skin map' of the image.

The skin map can be in the form of an array equaling the dimensions of image sensor array 120, with each bit of the map indicating whether the output of the corresponding sensor element represents skin or not (as a binary value). Alternatively, the skin map can have the same dimensions as the subsampled image described elsewhere in the present application, for reduced computational complexity.

The skin map may be generated for each frame (or at some intervals) in case of camcorder type devices in which the scene can change during recording. Even in still cameras, the skin map can be computed for every frame received since the degree of focus can have a bearing on the pixel values (used to determine whether the pixels represent skin or not). Alternatively, if it is assumed that the scene does not change, the skin map can be computed based on one of the frames received while attempting auto-focus.

Image processor 130 may then operate on the skin map as an input, to identify a facial region (an example of a region of interest in one embodiment), as described in detail below. First, the skin map is pre-processed to add additional pixels in a skin map as representing skin and to remove some pixels from being considered skin based on a recognition that points adjacent to skin are likely to be skin and points that are not adjacent to skin are unlikely to be skin.

Pre-Processing of Skin Map

Figure 6A:
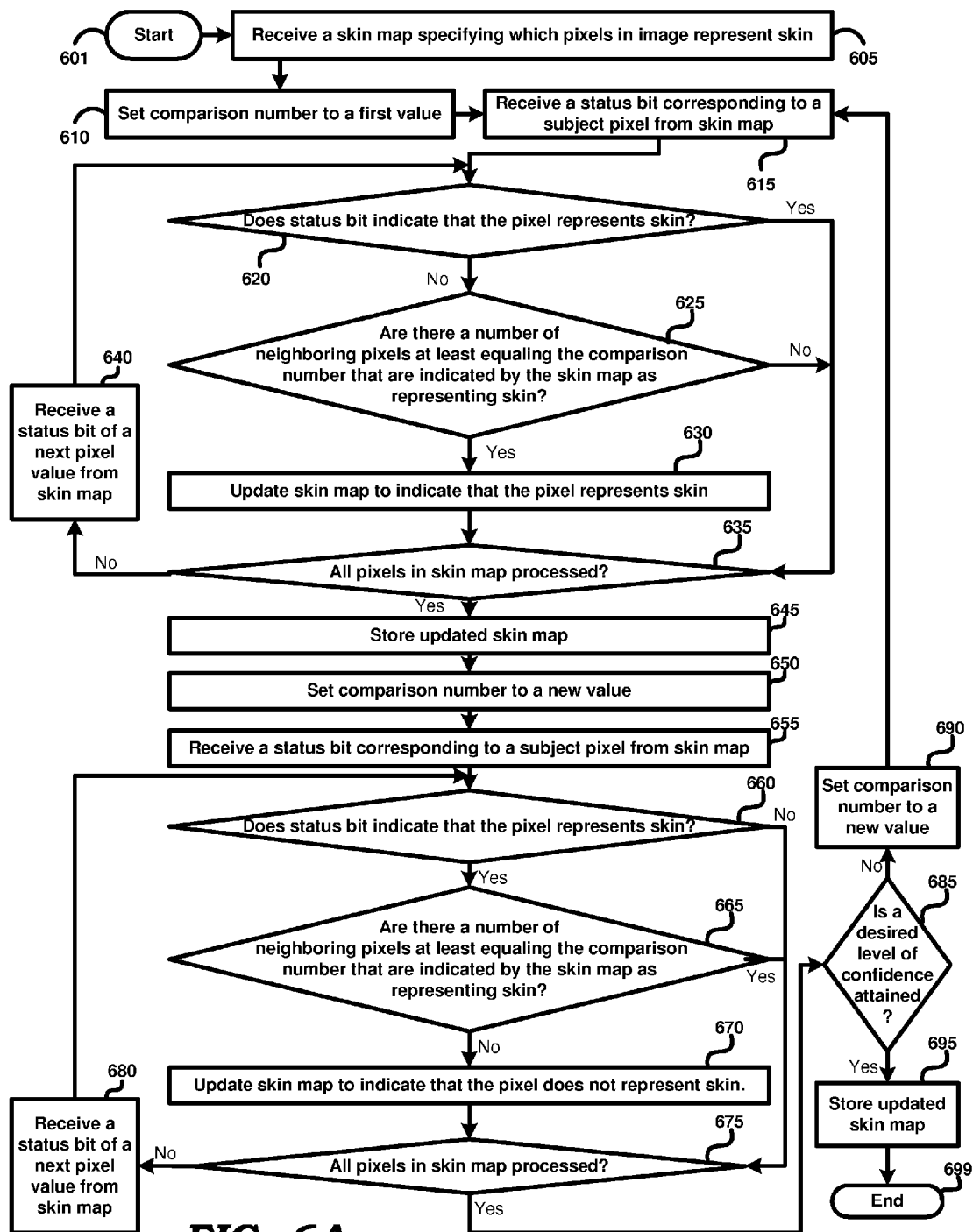
FIGS. 6A, 6B and 7 together represent a flowchart illustrating the manner in which a skin map may be pre-processed prior to determining regions forming a face in one embodiment.
Figure 6B:
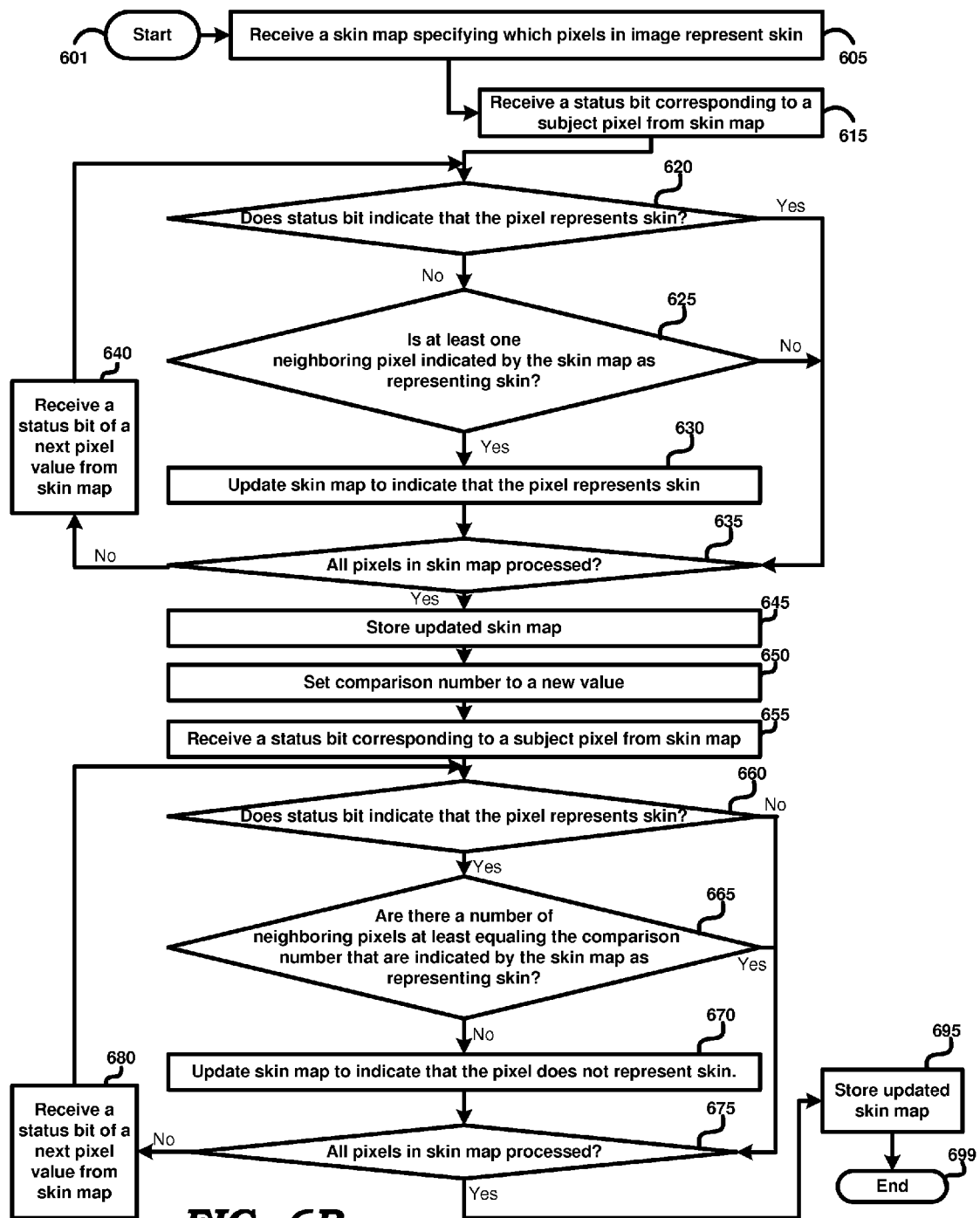
Figure 7:
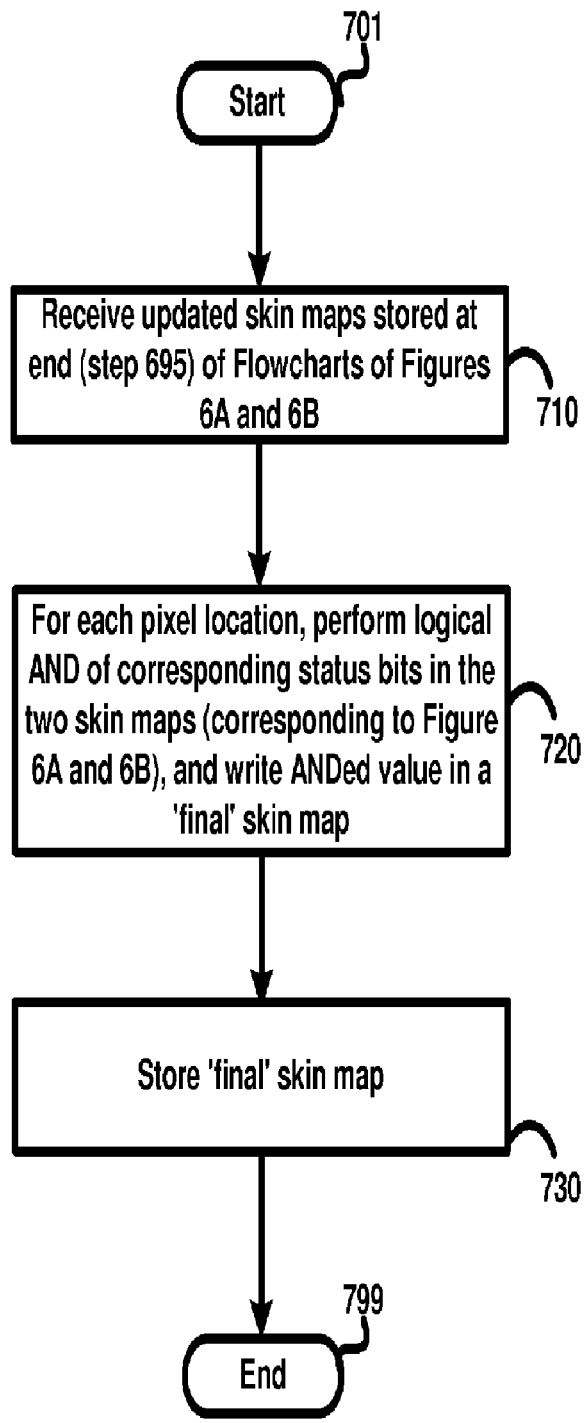

FIGS. 6A, 6B and 7 are flowcharts illustrating the manner in the skin map which may be pre-processed prior to determining regions forming a face in one embodiment. Again, the flowchart is described with respect to FIG. 1, and in relation to image processor 130, merely for illustration. However, various features can be implemented in other environments and other components. Furthermore, the steps are described in a specific sequence merely for illustration. Various alternative embodiments in other environments, using other components, and different sequence of steps can also be implemented without departing from the scope and spirit of several aspects of the present invention, as will be apparent to one skilled in the relevant arts by reading the disclosure provided herein. The flowchart of FIG. 6A starts in step 601, in which control passes immediately to step 605.

In step 605, image processor 130 receives a (source) skin map specifying which pixels in the image represent skin. The skin map is generated, for example, by image processor 130 as described above with respect to the flowchart of FIG. 5. Control then passes to step 610.

In step 610, image processor 130 sets a comparison number to a first value. As will be apparent from the description below, the comparison number indicates the number of neighboring pixels representing skin to be present before a subject pixel is also deemed to represent skin. Control then passes to step 615.

In step 615, image processor 130 receives a status bit corresponding to a pixel (as a subject pixel) from the skin map received in step 605. In an embodiment, the status bit is received as a binary value, wherein a binary 1 (0) specifies that the (first) pixel has been identified as representing skin, and a binary 0 (1) specifies otherwise. Control then passes to step 620.

In step 620, if the status bit indicates that the pixel represents skin, control passes to step 635, else control passes to step 625.

In step 625, image processor 130 determines from the skin map the number of pixels neighboring (immediately adjacent to) the subject pixel that also represent skin. Control passes to step 630 if image processor 130 determines (from the corresponding values in the skin map) that the number of neighboring pixels representing skin is equal to or greater than the comparison number, else control passes to step 635.

It must be noted that the operation of this step may be preformed at a macro-block level (group of pixels, e.g. 3.times.3 pixel block) instead of at the pixel level described above, i.e., if a predetermined number of macroblocks surrounding a current (subject) macroblock are marked as skin type then the current macroblock is also marked as skin-type macroblock. Each macroblock may initially be marked as skin type of at least a pre-specified number of pixels within the macroblock are indicated to represent skin in the source skin map.

In step 630, image processor 130 updates the skin map to indicate that the pixel represents skin. Control then passes to step 635.

In step 635, if image processor 130 determines that all pixels in the skin map have been processed control passes to step 645, else control passes to step 640. In step 640, image processor 130 receives a status bit of a next pixel from the skin map. Control then passes to step 620.

In step 645, image processor 130 stores the updated skin map. Control then passes to step 655. In step 650, image processor 130 sets the comparison number to a new value. Control then passes to step 655. In step 655, image processor 130 receives a status bit corresponding to a pixel (as a subject pixel) from the skin map received in step 605. Control then passes to step 660.

In step 660, if the status bit indicates that the pixel represents skin, control passes to step 665, else control passes to step 675. In step 665, image processor 130 determines from the skin map the number of pixels neighboring (immediately adjacent to) the subject pixel that also represent skin. Control passes to step 675 if image processor 130 determines (from the corresponding values in the skin map) that the number of neighboring pixels representing skin is equal to or greater than the comparison number, else control passes to step 670.

In step 670, image processor 130 updates the skin map to indicate that the pixel does not represent skin. Control then passes to step 675.

In step 675, if image processor 130 determines that all pixels in the skin map have been processed control passes to step 685, else control passes to step 680.

In step 680, image processor 130 receives a status bit of a next pixel from the skin map. Control then passes to step 660. In step 685, if image processor 130 determines that pre-processing of the skin has been performed to a desired level of confidence, control passes to step 695, else control passes to step 690. In an embodiment, a desired level of confidence level is deemed to be reached if a predetermined number of iterations of steps 615 through 675 have been performed. However, different approaches (e.g., based on different criteria such as number of pixels added/removed in an iteration) can be undertaken until a desired level of confidence is attained.

In step 690, image processor 130 sets the comparison number to a new value. In an embodiment, the comparison value set in this step is smaller than the comparison values set in the first iteration of steps 610 and 650. Control then passes to step

615, in which image processor 130 receives the status bit for a first pixel again from the skin map, and the operations of the flowchart are repeated.

In step 695, image processor 130 stores the pre-processed (updated) skin map for further processing. Control then passes to step 699, in which the flowchart ends.

In the flowchart of FIG. 6B all steps are identical to correspondingly (similarly) numbered steps in FIG. 6A, except for the following: a) Step 610 is not present, and control passes to step 615 after execution of step 605. b) In step 625, if image processor 130 determines that if at least one neighboring pixel is present which is indicated by the skin map as representing skin, control passes to step 630, else control passes to step 635. c) If in step 675, image processor 130 determines that all pixels in the skin map have been processed, control passes to step 695 in which the updated skin map is stored, and then to step 699 in which the flowchart ends.

It may be observed from the flowchart of FIG. 6A that several iterations of each of the two loops formed by steps 615-620-625-630-635-640-620, and by steps 655-660-665-670-675-680-660 may be performed, while only one iteration of each of the loops is performed in the flowchart of FIG. 6B.

The skin maps stored at the end (i.e., step 695) of flowcharts of FIGS. 6A and 6B are then processed as illustrated in FIG. 7. Merely for reference, the skin maps generated at the end of processing by the flowcharts of FIGS. 6A and 6B are respectively referred to as skin map A and skin map B. The flowchart of FIG. 7 starts in step 701, in which control passes immediately to step 710.

In step 710, image processor 130 receives the updated skin maps (A and B) stored at end (step 695) of Flowcharts of FIGS. 6A and 6B. Control then passes to step 720.

In step 720, for each pixel location in skin maps A and B, image processor 130 performs a logical AND operation of the corresponding status bits, and writes the ANDed value to the corresponding pixel location in a "final" skin map. Control then passes to step 730.

In step 730, image processor stores the 'final' skin map for further processing. Control then passes to step 799 in which the flowchart ends.

It may be observed that the operations of the steps of flowcharts 6A, 6B and 7 may add additional pixels in a skin map as representing skin and remove some pixels from being considered skin. In particular, the loop formed by steps 615-620-625-630-635-640-620 operates to mark 'non-skin' pixels as skin-pixels, and the loop formed by steps 655-660-665-670-675-680-660 operates to remove skin pixels from being considered skin.

As an example, pixels representing eye, although not of face color, would need to be identified (and included) as part of a facial region. The loop formed by steps 615-620-625-630-635-640-620 may cause addition of 'skin' pixels (pixels in the eye region added as 'skin' pixels) to the skin map, and thus enables identification of such pixels also as potentially lying in a facial region.

Noise and other undesirable effects may erroneously cause a pixel otherwise not representing skin to be captured as a 'skin' pixel in the skin map prior to the processing of FIG. 6. The loop formed by steps 655-660-665-670-675-680-660 may cause such a pixel to be removed from the pixel map. Also, it is noted that that the operation of the steps of flowcharts 6A and 6B, and the ANDing operation in flowchart of FIG. 7 may be performed to prevent or minimize the probability of two separate but closely spaced skin clusters from merging. At the completion of pre-processing, the 'final' skin map (obtained at step 730 of FIG. 7) may contain one or more 'clusters' of pixels (a group of adjoining/contiguous pixel locations) identified as skin pixels, each cluster potentially representing a facial region. Image processor 130 may then mark the boundaries of each of such clusters with a bounding rectangle, as described next.

Identifying and Marking Potential Facial Regions

Figure 8:
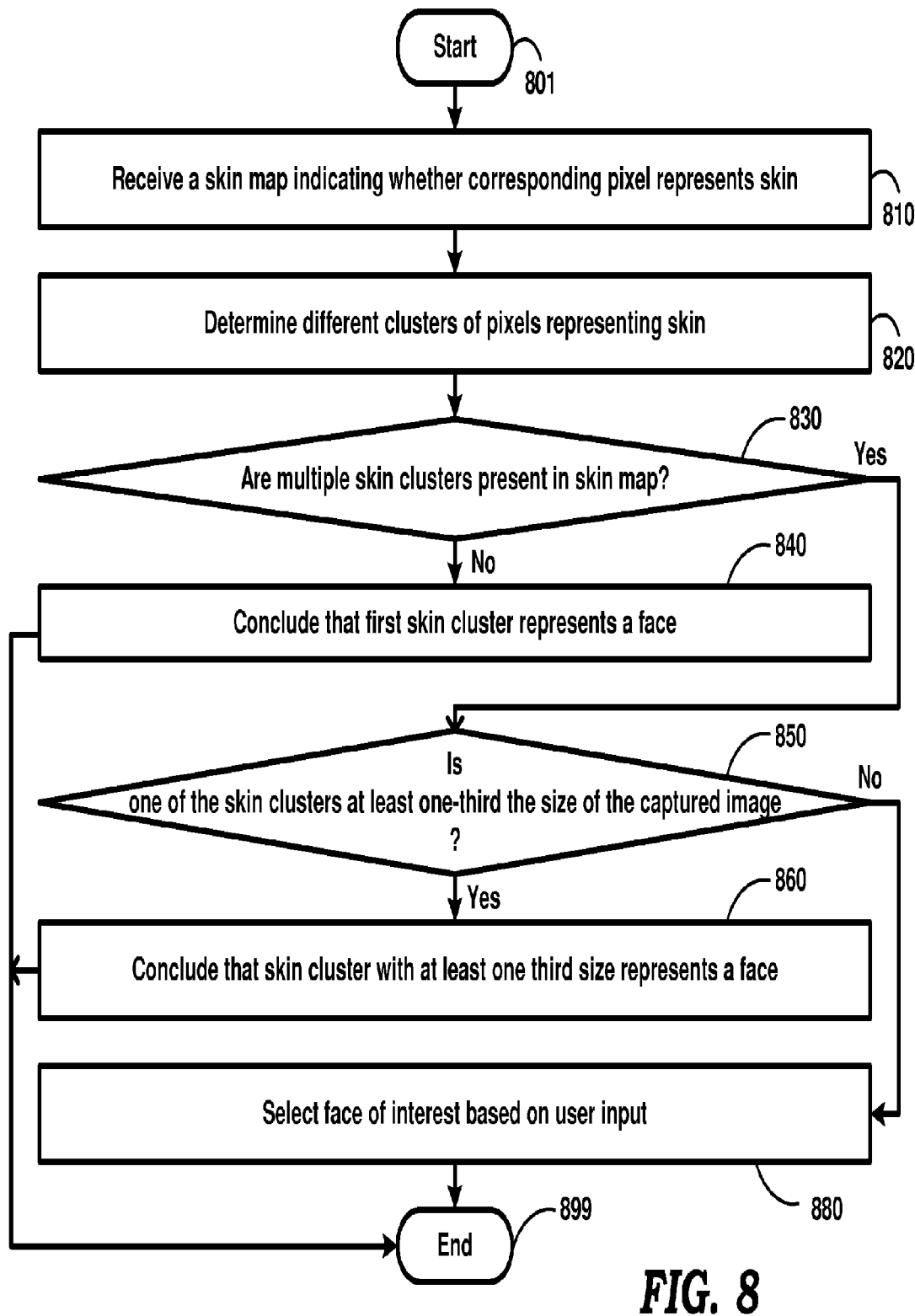
FIG. 8 is a flowchart illustrating the manner in which one or more cluster of pixels are identified and marked as potentially representing a desired facial region in one embodiment.

FIG. 8 is a flowchart illustrating the manner in which image processor 130 identifies and marks one or more cluster (group) of pixels as potentially representing a desired facial region in one embodiment. The flowchart is described with respect to a single cluster (termed 'first' cluster, merely to simplify the following description), however relevant steps (820-860) in the flowchart may be performed to locate all skin clusters present in the skin map. The flowchart starts in step 801, in which control passes immediately to step 810.

In step 810, image processor 130 receives a skin map indicating whether each corresponding pixel represents skin. The skin map may be pre-processed, for example, as described above with respect to the flowchart of FIGS. 6A, 6B, 7 and 8. Control then passes to step 820.

In step 820, image processor 130 determines different clusters of pixels representing skin by examining the skin map. In general, skin pixels in contiguous locations, reasonably representing dimensions of a face may be viewed as a cluster. Ideally, the number of clusters equals the number of faces (assuming non-overlap of faces in the captured image) in the image. Control then passes to step 830.

In step 830, image processor 130 checks whether there are multiple skin clusters present in skin map. Control passes to step 840 if there is only a single skin cluster, or else to step 850. In step 840, image processor 130 concludes that the lone skin cluster represents a face. Control then passes to step 899, in which the flowchart ends.

In step 850, image processor 130 checks whether one of the skin clusters is at least one-third (or some reasonably large size) the size of the captured image. Control passes to step 860 if there is such a skin cluster, or else to step 880.

In step 860, image processor 130 concludes that skin cluster with at least one third size represents a face. Control then passes to step 899.

In step 880, image processor 130 selects the face of interest based on user input. Thus, image processor 130 may display a rectangle surrounding each of the faces, and receive an input from user via input interface 160 indicating which of the rectangles should be used as a basis for auto-focusing. Control then passes to step 899.

Having thus identified the facial region of interest, image processor 130 processes the corresponding pixel values (for example, Y component, as described above) of pixels in the facial region, determines the corresponding degree of focus of the facial region, and provides a set of configuration parameters to lens assembly 115 to focus (with a desired degree of focus) on the facial region as described in sections above. The operation of the steps described above is briefly illustrated below with an example.

Illustrative Example of Facial Region Identification

FIGS. 9A-9J provide an example illustration of the operation of the steps of flowcharts of FIGS. 6A, 6B, 7 and 8. Black areas in the Figures denote skin pixels, and white areas denote non-skin pixels.

Figure 9A:
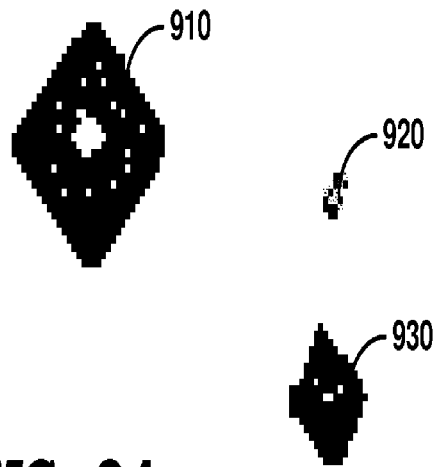
FIGS. 9A through 9J are example diagrams illustrating the operation of the flowcharts of FIGS. 6A, 6B, 7 and 8 in one embodiment.

In FIG. 9A, a (source) skin map 900 of a captured image is shown in which three skin clusters 910, 920 and 930 may be seen.

Figure 9B:
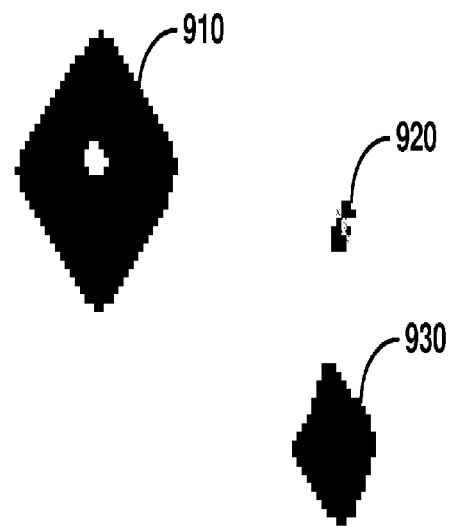

A first iteration of steps 615-620-625-630-635-640-620 (FIG. 6A) with comparison number set to 3 (step 610) may result in the skin map of FIG. 9A updated to provide the skin map of FIG. 9B, in which it may be seen that some non-skin (white) pixels in each of clusters 910, 920 and 930 have been indicated as skin (black) pixels.

Figure 9C:
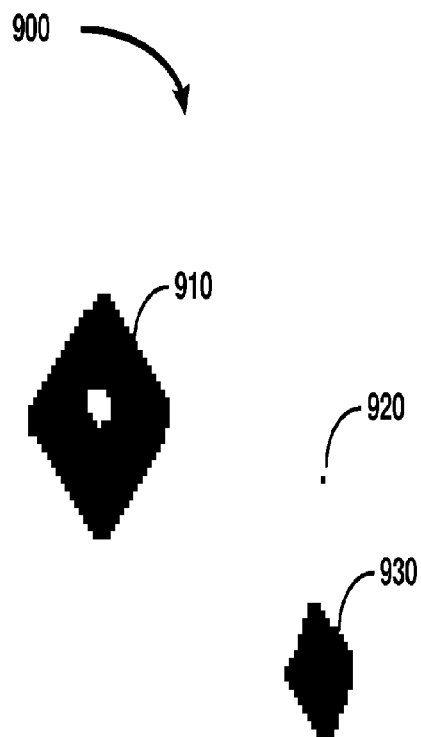

A first iteration of steps 655-660-665-670-675-680-660 (FIG. 6A) with comparison number set to 5 (step 650) may result in the skin map of FIG. 9B updated to provide the skin map of FIG. 9C, in which it may be seen that some skin pixels in clusters 910 and 920 have been removed.

Figure 9D:
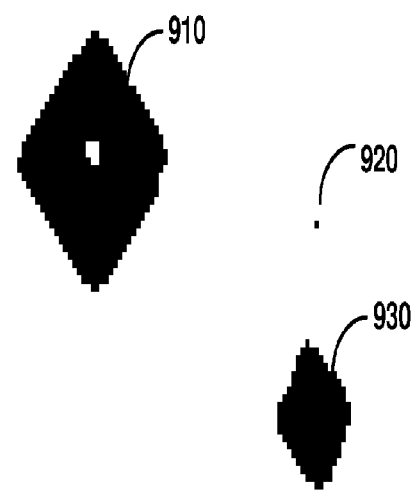

A second iteration of steps 615-620-625-630-635-640-620 (FIG. 6A) with comparison number set to 3 (step 610) may result in the skin map of FIG. 9C updated to provide the skin map of FIG. 9D, in which it may be seen that some non-skin pixels in cluster 910 have been indicated as skin pixels.

Figure 9E:
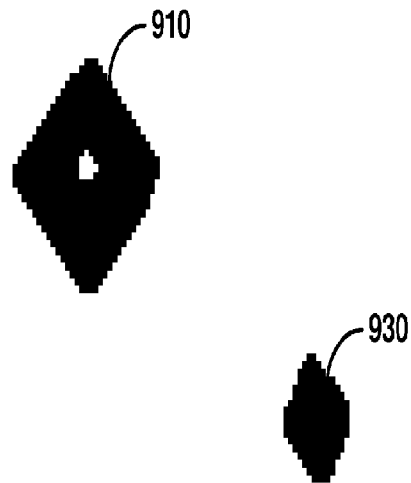

A second iteration of steps 655-660-665-670-675-680-660 (FIG. 6A) with comparison number set to 5 (step 650) may result in skin map of FIG. 9D updated to provide the skin map of FIG. 9E, in which it may be seen that some skin pixels in cluster 910 have been removed, and cluster 920 has been completely removed.

Figure 9F:
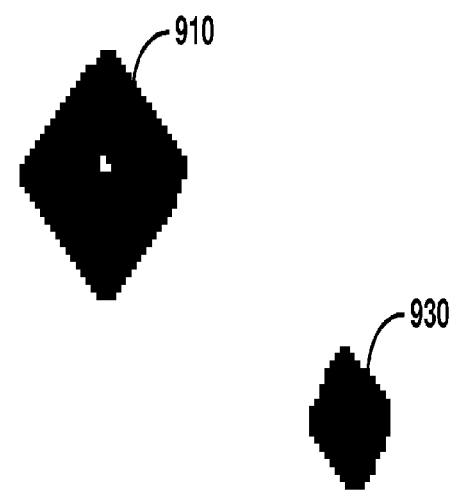

A third iteration of steps 615-620-625-630-635-640-620 (FIG. 6A) with comparison number set to 2 (step 610) may result in the skin map of FIG. 9E updated to provide the skin map of FIG. 9F, in which it may be seen that some non-skin pixels in cluster 910 have been indicated as skin pixels.

Figure 9G:
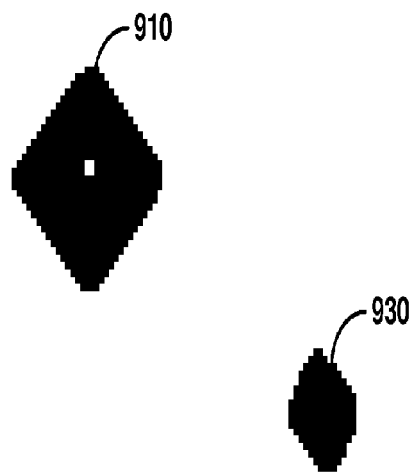

A third iteration of steps 655-660-665-670-675-680-660 (FIG. 6A) with comparison number set to 5 (step 650) may result in skin map of FIG. 9F updated to provide the skin map of FIG. 9G.

Figure 9H:
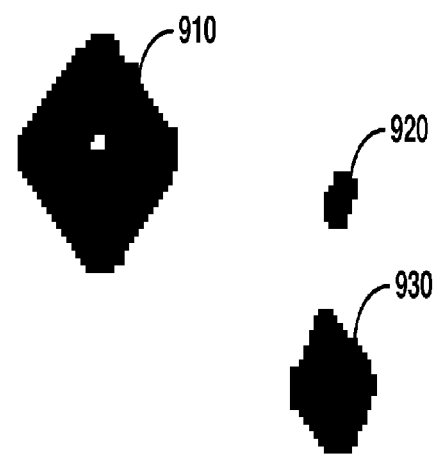

Operation of steps 615-620-625-630-635-640-620 (FIG. 6B) may result in the skin map of FIG. 9A updated to provide the skin map of FIG. 9H, in which it may be seen that some non-skin pixels in clusters 910, 920 and 930 have been indicated as skin pixels. FIG. 9H may be compared with FIG. 9B which was obtained using a comparison number of three.

Figure 9I:
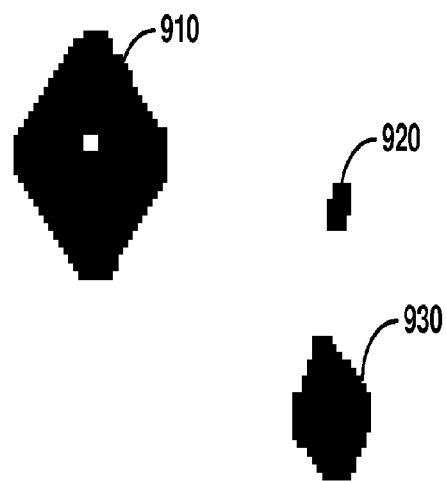

Operation of steps 655-660-665-670-675-680-660 (FIG. 6B) with comparison number set to 5 (step 650) may result in the skin map of FIG. 9H updated to provide the skin map of FIG. 9I, where some pixels have been removed.

Figure 9J:
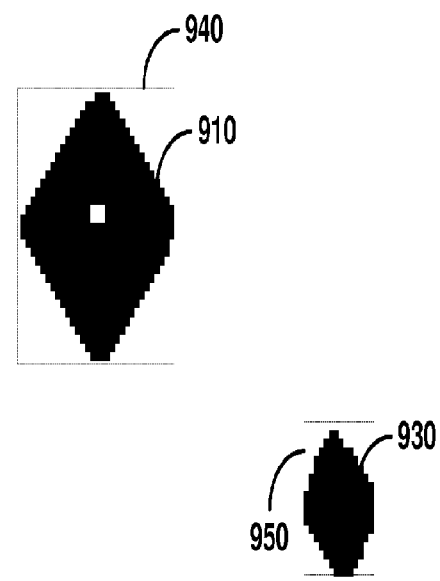

Finally, FIG. 9J shows the 'final' skin map obtained by ANDing corresponding pixels in the skin maps of FIGS. 9G and 9I. FIG. 9J shows two skin clusters 910 and 930. Operation of the steps of the flowchart of FIG. 8 identify (locate) the two skin clusters 910 and 930, and marks the corresponding boundaries 940 and 950.

Image processor 130 may display the image corresponding to the skin map shown in FIG. 9J, and prompt the user to indicate the desired region of interest. The user may then indicate, via input interface 160 (shown in FIG. 1), that the desired region of interest is region 940 containing skin cluster 910 (which may correspond to a face). Image processor 130 then focuses on region 910 by configuring the parameters of lens assembly 115 in a manner described in sections above, and waits for the user to 'click' and captures and stores the focused image. An embodiment of image processor 130 is described next.

Image Processor

Figure 10:
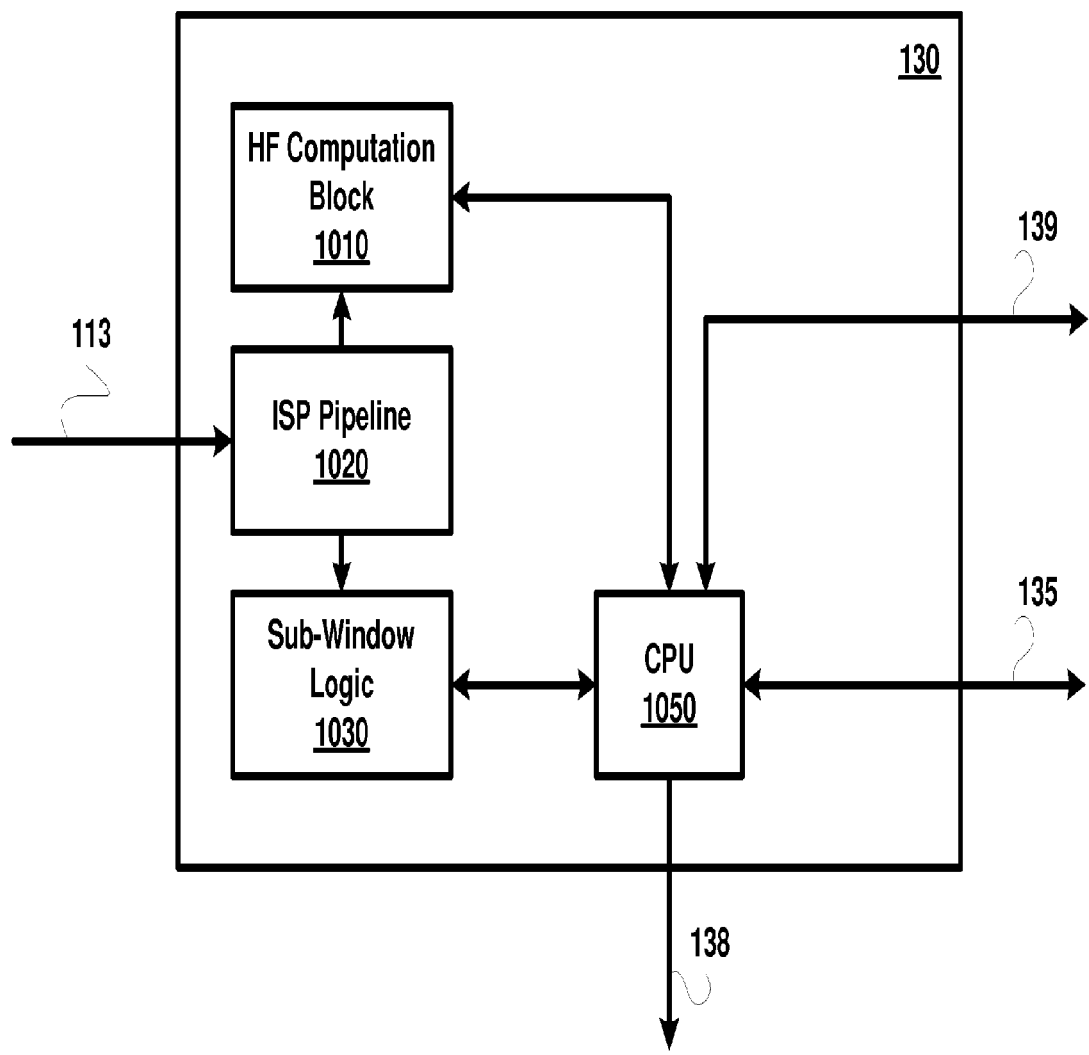
FIG. 10 is a block diagram of the internal details of an image processor operating to configure a lens assembly to provide auto-focus feature in one embodiment.

FIG. 10 is a block diagram of image processor 130 in one embodiment. Image processor 130 is shown containing high frequency computation block 1010, image signal processor (ISP) pipeline 1020, sub-window logic 1030, and central processing unit (CPU) 1050. Image processor 130 may contain other components/blocks also, but are not shown as not being relevant to an understanding of the described embodiment(s). Each component is described in detail below.

ISP pipeline 1020 receives a stream of pixel values representing an entire image (row wise) on path 113. The pixel values may be received directly from image sensor array 120 (of FIG. 1). ISP pipeline 1020 may be implemented as a shift register, and shifts in pixels received on path 113, and transfers (stores) the pixels to buffer registers or other internal buffer. ISP pipeline 1020 may perform various operations on the stored pixels such as optical black restoration (subtracting a black color reference level from each of the pixels), sensor linearization (which removes non-linear effects of image sensor array 120), white balance, color correction (transformation of pixel values from one color space to another specific color space), gamma correction, demosaicing (individual R/G/B pixel signals obtained from Bayer color filter array converted to simultaneous R/G/B component values), etc., as suited for the specific environment.

HF computation block 1010 retrieves a set of pixel values from ISP pipeline 1020, and computes a rate of variation of luminance across the pixels, and provides a corresponding high frequency value as a measure of the rate of variation of luminance to image processor 130. With respect to FIG. 4A and the section 'Digital Characterization of Degree of Focus' above, CPU 1050 may specify to HF computation block 1010 the pixel locations of pixels in object 410 in image 400. HF computation block 1010 may then retrieve the corresponding pixel values from ISP pipeline 1020, and compute a 'rate of variation' of luminance value (which may be, for example, a single number) of the pixels in object 410, and forward the value to CPU 1050. In one embodiment, HF computation block 1010 is implemented using a Sobel operator noted above, and adding some of the output values of the Sobel operator to generate a single value representing the rate of variation.

Sub-window logic 1030 receives control inputs from CPU 1050 specifying dimensions and locations of one or more sub-windows (rectangular areas) in the captured image that are to be subsampled. For each of a group (for example, nine adjacent pixels) of pixel values in the sub-window, sub-window logic 1030 computes the average of the pixel values in the group, and generates a corresponding single pixel value having the computed average value. The 'averaged' pixels thus generated form a subsampled version of portion of the image in the sub-window, and the subsampled version is provided by sub-window logic 1030 to image processor 130. In an embodiment, sub-window logic 1030 provides a 64.times.64 pixel wide subsampled version of images captured by image sensor array 120, and provides them to image processor 130 as noted above with respect to step 210 of the flowchart of FIG. 2. Operation on such sub-sampled images reduces the computational requirements in CPU 1050.

CPU 1050 performs the logic specified in FIG. 2 based on the subsampled images received from sub-window logic 1030 and high frequency values received from HF computation block 1010. In particular, CPU 1050 determines the region of interest (as described above with respect to FIGS. 5, 6A, 6B, 7 and 8) and indicates the region to HF computation block 1010. The instructions, which cause CPU 1050 to provide such features, may be received on path 135 or via 139. CPU 1050 may store skin map in RAM 190 via path 139.

It may be appreciated that CPU 1050 determines the skin map and region of interest, and can provide the appropriate control values (including identification of the region of interest) to HF computation block 1010. Then, for each image of the scene, CPU 1050 may receive a high frequency measure (representing the degree of focus). CPU 1050 may send configuration parameters (i.e., number indicating distance) on path 138 to configure lens assembly 115.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of processing a plurality of pixel values representing an image each of said plurality of pixel values being represented by a corresponding triplet of values containing a luminance value and a pair of chrominance values, said method comprising:

comparing a first one of said pair of chrominance values corresponding to a first pixel value of said plurality of pixel values to a first range;

comparing a second one of said pair of chrominance values corresponding to said first pixel value to a second range;

comparing a sum of said pair of chrominance values corresponding to said first pixel value to a third range;

determining that said first pixel value represents a point on a desired object if said first one of said pair of chrominance values lies within said first range, if said second one of said pair of chrominance values lies within said second range, and if said sum of said pair of chrominance values lies within said third range; and locating a first cluster of pixel locations representing said desired object.

2. The method of claim 1, wherein:

said desired object is skin;

said first one and said second one of said pair of chrominance values correspond respectively to Cb and Cr values in a YCbCr color space;

said first range comprises the range of values from 67 to 123 in said YCbCr color space;

said second range comprises the range of values from 136 to 175 in said YCbCr color space; and said third range comprises the range of values from 220 to 275 in said YCbCr color space.

3. The method of claim 2, further comprising generating a skin map of said image, wherein said skin map indicates whether a corresponding pixel location of said image represents skin or not.

4. The method of claim 3, further comprising pre-processing said skin map to identify a region of interest characterized by skin, wherein a first pixel location in said skin map indicated as not representing skin is updated to indicate that said pixel location represents skin if said pixel location has at least a first number of neighboring pixel locations also indicated as representing skin, and wherein a second pixel location in said skin map indicated as representing skin is updated to indicate that said second pixel location does not represent skin if said pixel location has less than said first number of neighboring pixel locations indicated as representing skin.

5. The method of claim 4, wherein said locating said first cluster of pixel locations comprises locating a first cluster of pixel locations representing skin, and marking a boundary region encompassing said first cluster.

6. The method of claim 5, wherein said first cluster of pixel locations is identified as said region of interest if an area of said first cluster is greater than or equal to one-third of the area of said image.

7. The method of claim 6, wherein said first cluster of pixel locations is identified as said region of interest even if a second cluster of pixel locations representing skin is also located in said image if a user indicates that said first cluster of pixel locations is said region of interest.

8. The method of claim 7, further comprising computing a rate of variation of luminance values of pixel locations contained in said first cluster of pixel locations to determine a degree of focus of said first cluster of pixel locations.

9. The method of claim 1, wherein said region of interest comprises a face such that a user can obtain images having clarity with respect to said face.

10. An image capture device comprising:

an image sensor designed to receive light representing an image, and generate a plurality of sets of pixel values, each set of pixel values being represented by a corresponding triplet of values including a luminance value and a pair of chrominance values;

a lens assembly configurable to focus said image on said image sensor; and an image processor configured to perform the actions of:

compare a first one of said pair of chrominance values corresponding to said first pixel value with in a first range, compare a second one of said pair of chrominance values corresponding to said first pixel value with in a second range, and compare a sum of said pair of chrominance values corresponding to said first pixel value with in a third range;

determining that said first pixel value represents a point on a desired object if said first one of said pair of chrominance values lies within said first range, if said second one of said pair of chrominance values lies within said second range, and if said sum of said pair of chrominance values lies within said third range;

locating a first cluster of pixel values representing said desired object; and marking a boundary region encompassing said first cluster.

11. The image capture device of claim 10, wherein:

said desired object is skin;

said image processor locates a set of contiguous pixels representing an object of interest present in said image to identify said region of interest;

said region contains said desired object; and said set of contiguous pixel values are contained in at least one of said plurality of sets of pixel values.

12. The image capture device of claim 11, wherein said desired object comprises a face such that a user can obtain images having clarity with respect to said face.

13. The image capture device of claim 12, wherein said image processor determines that said first pixel value represents a point on said face if said first one of said pair of chrominance values lies within said first range, if said second one of said pair of chrominance values lies within said second range, and if said sum of said first one and said second one of said pair of chrominance values lies within said third range.

14. A non-transitory computer readable medium comprising a plurality of programmed instructions for focusing a lens assembly in an image capture device (ICD), said computer readable medium being contained in said ICD, wherein said sequences of instructions comprise:

instructions to compare a first one of said pair of chrominance values corresponding to said first pixel value with in a first range;

instructions to compare a second one of said pair of chrominance values corresponding to said first pixel value lies in a second range;

instructions to compare a sum of said pair of chrominance values corresponding to said first pixel value with in a third range;

instructions to determine that said first pixel value represents a point on a desired object if said first one of said pair of chrominance values lies within said first range, if said second one of said pair of chrominance values lies within said second range, and if said sum of said pair of chrominance values lies within said third range; and instructions to locate a first cluster of pixel locations representing the desired object.

15. The non-transitory computer readable medium of claim 14, wherein:
said desired object is skin;
said first one and said second one of said pair of chrominance values correspond respectively to Cb and Cr values in a YCbCr color space;
said first range comprises the range of values from 67 to 123 in said YCbCr color space;
said second range comprises the range of values from 136 to 175 in said YCbCr color space; and
said third range comprises the range of values from 220 to 275.

16. The non-transitory computer readable medium of claim 14 further comprising instructions to generate a skin map of said image, wherein said skin map indicates whether a corresponding pixel location of said image represents skin or not.

17. The non-transitory computer readable medium of claim 14 further comprising instructions to pre-process said skin map to identify a region of interest characterized by skin, wherein a first pixel location in said skin map indicated as not representing skin is updated to indicate that said pixel location represents skin if said pixel location has at least a first number of neighboring pixel locations also indicated as representing skin, further wherein a second pixel location in said skin map indicated as representing skin is updated to indicate that said second pixel location does not represent skin if said pixel location has less than said first number of neighboring pixel locations indicated as representing skin.

18. The non-transitory computer readable medium of claim 14, wherein said instructions to locate said first cluster of pixel locations representing a desired object comprises instructions to locate a first cluster of pixel locations representing skin, and marking a boundary region encompassing said first cluster.

19. The non-transitory computer readable medium of claim 14, wherein said first cluster of pixel locations is identified as said region of interest if an area of said first cluster is greater than or equal to one-third of the area of said image.

20. The non-transitory computer readable medium of claim 14, wherein said first cluster of pixel locations is identified as said region of interest even if a second cluster of pixel locations representing skin is also located in said image if a user indicates that said first cluster of pixel locations is said region of interest.

21. The non-transitory computer readable medium of claim 14, further comprising instructions to compute a rate of variation of luminance values of pixel locations contained in said first cluster of pixel locations to determine a degree of focus of said first cluster of pixel locations.

22. The non-transitory computer readable medium of claim 14, wherein said region of interest comprises a face such that a user can obtain images having clarity with respect to said face.

* * * * *